(12) United States Patent
Boesser et al.

(10) Patent No.: US 7,450,246 B2
(45) Date of Patent: Nov. 11, 2008

(54) MEASURING DEVICE AND METHOD FOR DETERMINING RELATIVE POSITIONS OF A POSITIONING STAGE CONFIGURED TO BE MOVEABLE IN AT LEAST ONE DIRECTION

(75) Inventors: Hans-Artur Boesser, Breidenbach (DE); Klaus-Dieter Adam, Jena (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 178 days.

(21) Appl. No.: 11/432,949

(22) Filed: May 12, 2006

(65) Prior Publication Data
US 2006/0279743 A1    Dec. 14, 2006

(30) Foreign Application Priority Data
May 13, 2005    (DE) ................. 10 2005 023 085
Jul. 27, 2005    (DE) ................. 10 2005 035 700

(51) Int. Cl.
*G01B 11/02*    (2006.01)
(52) U.S. Cl. ...................................... 356/500
(58) Field of Classification Search ................. 356/485, 356/486, 487, 496, 498, 500
See application file for complete search history.

(56) References Cited

U.S. PATENT DOCUMENTS 5,164,792 A * 11/1992 Matsui et al. ............... 356/500
6,323,953 B1   11/2001 Blaesing-Bangert et al.
6,816,263 B2   11/2004 Kaczynski et al.
6,842,256 B2 *  1/2005 Hill ............................ 356/517

FOREIGN PATENT DOCUMENTS

DE    198 19 492    11/1999
DE    101 31 898    1/2003

* cited by examiner

Primary Examiner—Michael A Lyons
(74) Attorney, Agent, or Firm—Simpson & Simpson, PLLC

(57) ABSTRACT

A measuring apparatus for determining relative positions of a positioning stage arranged in a moveable fashion in at least one direction by a predeterminable maximum traversing path. The measuring device comprises at least one interferometric measuring means and at least one interferometric correction means. An interferometric measuring means is operable with the laser light of a laser of at least one wavelength. Correction results can be generated with the interferometric correction means allowing conclusions to be drawn with respect to the actual wavelength of the laser light during a position determination of the positioning stage in order to take into account variations of the wavelength of the laser light, in particular due to ambient conditions, when evaluating the measuring results. The interferometric correction means is arranged proximate to the interferometric measuring means, and the proximity corresponds to a predeterminable portion of the maximum traversing path of the positioning stage.

20 Claims, 5 Drawing Sheets

MEASURING DEVICE AND METHOD FOR DETERMINING RELATIVE POSITIONS OF A POSITIONING STAGE CONFIGURED TO BE MOVEABLE IN AT LEAST ONE DIRECTION

CROSS REFERENCE TO RELATED APPLICATIONS

This application claims priority of German Patent Application No. 10 2005 023 085.7, filed May 13, 2005, and German Patent Application No. 10 2005 035 700.8, filed Jul. 27, 2005, which applications are incorporated herein by reference.

FIELD OF THE INVENTION

The present invention relates to a measuring device for determining relative positions of a positioning stage configured to be moveable in at least one direction by a predeterminable maximum traversing path. The measuring device comprises at least one interferometric measuring means and at least one interferometric correction means. An interferometric measuring means is for obtaining measuring results to determine relative positions of the positioning stage for a movement along a movement direction. An interferometric measuring means is operable with laser light of a laser of at least one wavelength. The interferometric correction means is for obtaining correction readings allowing conclusions to be drawn with respect to the actual wavelength of the laser light during a position determination of the positioning stage in order to take into account a change of the wavelength of the laser light, in particular due to ambient influences, for evaluating the measuring results. The present invention also relates to methods for determining relative positions of a positioning stage moveable in at least one direction.

BACKGROUND OF INVENTION

Interferometric measuring means are often used for highly precise distance and position measurements. In a high-precision interferometric measurement the relative difference in distance between a measuring beam and a reference beam is usually measured with the beam path of an interferometric measuring means. A beam splitter of the interferometric measuring means is for dividing the light generated by a laser into a measuring beam and a reference beam. The measuring beam passes between a beam splitter of the interferometric measuring means and a measuring mirror, wherein the measuring mirror is arranged at a moveable measuring object, i.e., for example, on a positioning stage. The reference mirror is fixed with respect to the beam splitter of the interferometric measuring means. The measurement serves to determine how the phase of the light changes as the measuring object moves. The measuring accuracy is dependent, apart from the correct adjustment of the optical axes or the optics itself, on the signal processing (electronics, software) and the calibration of the overall system, also on the ambient conditions, such as the composition of the ambient air, moisture, temperature and pressure. The wavelength of the light beam is the basic measuring unit of the measurement. The relative difference in distance is therefore indicated in the unit "wavelength". The current value of the wavelength of a light beam is a function of the refractive index of the medium passed by the light beam. The refractive index varies, for example, due to gradual variations or rapid fluctuations of the temperature, air pressure and moisture, or due to changes in the air composition. The fluctuations in the readings due to wavelength variations, at ±0.1 µm, are no longer negligible with respect to the structures to be measured in typical measurements, such as in a coordinate measuring device on wafers and masks, and are therefore no longer acceptable for the required measuring accuracy. To increase the measuring accuracy it is therefore necessary to take into account wavelength variations of the light beam by means of a continuous wavelength correction.

For high precision distance measurements, a coordinate measuring device, such as it is known from DE 198 19 492 could be operated in a climatic chamber. Herein, at least the temperature is maintained at a constant level, in some climatic chambers the moisture is also maintained at a constant level. The control accuracy of temperature and moisture has technical limits. With a reasonable expenditure of effort, it is impossible to create a hermetically sealed chamber to maintain a constant air pressure, in particular since in the example of a coordinate measurement device it is necessary that the measuring objects can be exchanged simply and rapidly. Even the operation of the loading door causes rapid pressure fluctuations. The ambient conditions are defined by a climatic chamber via the feedback of temperature sensors and humidity sensors, and via over-pressure adjustments. "Over-pressure" refers to a positive pressure differential of a few Pascal with respect to the ambient pressure of the climatic chamber. Fluctuations of the air pressure within the chamber are caused by the measuring structure itself and are therefore not entirely avoidable. Further tolerances for the chamber are: with respect to the temperature $1/100$ degree (in time), $2/100$ degree spatially and with respect to the humidity ±1%. The measuring signals are detected in the X and Y directions with a nominal detector accuracy of $\Delta\lambda/2048 \sim 0.3$ nm ($\lambda$=laser wavelength=632.9 nm). As a result the interferometer wavelength must be continuously detected in a separate measurement. This can be done by measuring a wavelength calibration distance with a constant length, a "wavelength tracker", or by measuring the influential factors, such as temperature, air moisture etc., while continuously calculating the current wavelength. One example of such an interferometric correction means is the commercially available laser interferometer HP 10702 of Agilent (formerly Hewlett Packard).

The light generated by a laser is divided into two partial beams by a beam splitter of the interferometric correction means. The two partial beams pass between the beam splitter of the interferometric correction means and a reference mirror fixed with respect to the beam splitter of the interferometric correction means. The two partial beams, also referred to as reference beams in the following, have optical paths of different lengths. Thus for a coordinate measuring device a wavelength tracker is usually provided which is arranged at a site on the coordinate measuring device that seems to be suitable for detecting changes in ambient conditions and where basically there is structural space available for it. It is necessary, however, to always point out possibilities for increasing the measuring accuracy of a coordinate measuring device or a measuring system. This can also be achieved by increasing the accuracy when determining changes in ambient conditions.

In a coordinate measuring device, the object to be measured is positioned or moved with the aid of a positioning stage relative to the detection optics in order to optically detect each area to be imaged by the optics of the usually planar surface of the object to be measured. Herein the surface of the usually square or circular shape of the object has a size of between about 10 cm×10 cm and about 30 cm×30 cm, or a diameter of about 10 cm to about 30 cm. In order to inspect the whole surface of the object with the aid of the coordinate measuring device, it should be possible to position the object with the positioning stage on a traversing path essentially corresponding to the size or the dimensions of the surface of the object. This is why the maximum traversing path of the moveable positioning stage is usually a function of the size of the surface of the object normally to be inspected by the coordinate measuring device. Similar considerations generally apply to measuring assemblies in which the most stringent requirements apply to the measuring accuracy.

SUMMARY OF THE INVENTION

It is therefore an object of the present invention to provide and further develop a measuring device for determining relative positions of a positioning stage at least moveable in one direction of the initially mentioned type, by which the above mentioned problems are overcome. In particular it should be possible to achieve increased accuracy in determining changes in the ambient influences.

The inventive measuring device of the initially mentioned type solves the above object and comprising at least one interferometric measuring means and at least one interferometric correction means, wherein measuring results for determining relative positions of the positioning stage for a movement along a movement direction are able to be generated by an interferometric measuring means, wherein an interferometric measuring means is operable with laser light of a laser of at least one wavelength, wherein correction results are able to be generated with the interferometric correction means, allowing conclusions to be drawn about the actual wavelength of the laser light during a position determination of the positioning stage in order to take into account a variation of the wavelength of the laser light, in particular due to ambient conditions, for an evaluation of the measuring results, wherein the interferometric correction means is proximate to the interferometric measuring means and the proximity corresponds to a predeterminable portion of the maximum traversing path of the positioning stage.

According to the present invention it has been found that, even if only varied slightly, the ambient conditions that have an effect on the interferometric measuring means can be corrected with a particularly high degree of accuracy if the interferometric correction means is arranged proximate to the interferometric measuring means. For most applications it is therefore sufficient for the interferometric correction means to be at a distance of no more than about 20 cm to about 30 cm from the interferometric measuring means. In this case local changes in the external ambient conditions can be detected directly where they arise or where they are created and therefore where they have an effect on the corresponding measurements. Basically the distance between the interferometric correction means and the interferometric measuring means is chosen such that a predeterminable accuracy is achievable in the detection of wavelength variations depending on the concrete application, the overall measuring assembly, and the ambient conditions of the measuring assembly. An indication herefore could be derived, for example, from an estimation according to Edlen describing the dependence of the refractory index of air $n_L$ on the temperature and pressure:

$$n_L = 1 + 2.87755 \ 10^{-7} p^* Func(p,T) - 2.6 \ 10^{-9} e^{-0.0057627T} F_R,$$

with $$Func(p,T) = (1 + p(0.612 - 0.01010^{-6}T))/(1 + 0.0036610T)$$

T=temperature in degrees Celsius

P=pressure in hPa $F_R$=the relative air moisture in %.

In a coordinate measuring device this depends in particular on the characteristics of the climatic chamber, the flow properties and the position of the heat sources. Values for the portion of the maximum traversing path of the positioning stage could be any values ranging from 1 to 0. Preferably a smaller value is sought to be achieved for the portion of the maximum traversing path of the positioning stage, which means that the interferometric correction means is arranged as closely as possible to the interferometric measuring means so that a high correction quality can be achieved. As a result the correction data measured according to the present invention can be incorporated in the evaluation of the measuring results so that a measuring result of increased accuracy can be achieved overall. Unlike the prior art the interferometric correction means is not arranged at the location of a measuring system or on a coordinate measuring device which is relatively remote from the location of the interferometric measuring means. In such a case known from the prior art, the changes in the ambient influences are only measured with respect to this location and incorporated into the measuring result of one or more interferometric measuring means, even if possibly there were completely different ambient conditions, at least temporarily, at the site (or sites) of the interferometric measuring means. Since the varying ambient conditions, sometimes temporarily present, are now directly detected by the aid of the interferometric correction means at the location of the interferometric measuring means and are incorporated into the measuring results of the interferometric measuring means as a measuring correction, increased precision in the determination of the variation of the ambient conditions is achievable. This is how the correction quality and thus the measuring accuracy of the overall measuring system of the coordinate measuring device can be improved in a particularly advantageous way, all the more so, since the more climatic variations occur on the correction distance the more they have an effect on the measuring distance or arise on the measuring distance itself. Therefore, ideally, the correction distance and the measuring distance should overlap each other at least to a great extent.

An interferometric correction means could be arranged in an area traversed or crossed by the positioning stage and which could be positioned above or below the positioning stage. Such an arrangement of the interferometric correction means is suitable in particular with a positioning stage which is moveably arranged in two directions (X and Y directions). It is therefore conceivable to arrange one interferometric correction means essentially at the position of each interferometric measuring means, but above or below each interferometric measuring means with reference to the positioning stage. It is also conceivable to arrange at least one interferometric correction means above and/or below the positioning stage, which has its measuring direction or the path of its partial beams arranged essentially in a diagonal direction with respect to the positioning stage, which is usually of a rectangular configuration.

In a preferred embodiment an interferometric correction means is directly adjacent to an interferometric measuring means. If the measuring system has three interferometric measuring means for detection of an object movement in three different spatial directions, each interferometric measuring means of this measuring system has an interferometric correction means associated with it in a directly adjacent relationship.

For the variations of the ambient conditions to be measured with a precision which is as high as possible with an interferometric correction means associated with an interferometric measuring means, it is preferably provided for at least a portion of the beam path of the interferometric measuring means to be essentially parallel to at least a portion of the beam path of the interferometric correction means. Herein the parallel portions of the beam paths are suitably that portion of the interferometric measuring means which is also used for measuring. As a result the two parallel aligned portions of the beam paths are subject to almost the same localized variations of the ambient conditions.

In a concrete implementation, the interferometric correction means could be constructed according to the teaching of DE 101 31 898 A1. For a more detailed description of such interferometric correction means, reference is made to the entire disclosure of publication of patent application DE 101 31 898 A1, which is incorporated herein by reference in its entirety.

In a particularly preferred embodiment an interferometric correction means is incorporated in an interferometric measuring means. As a result the interferometric measuring means and the interferometric correction means form a common assembly. Compared to the approach according to which an interferometric correction means is provided for each interferometric measuring means, optical components can be saved in an advantageous way and therefore manufacturing costs can be reduced. Furthermore, common adjustment of the common assembly is necessary, which is why the interferometric measuring means need not be adjusted as well as the interferometric correction means. This serves to reduce assembly and manufacturing times and therefore manufacturing costs. It is almost impossible to arrange the interferometric correction means any more closely to the interferometric measuring means so that the accuracy achievable should be optimized in the present embodiment. The beam paths or at least a substantial portion of the beam paths of the interferometric measuring means and the interferometric correction means could be essentially aligned in parallel. As a result ultimately comparable measuring conditions are present for the beam paths of both the interferometric measuring means and the interferometric correction means.

Also, as an interferometric measuring means an interferometer may be suitable which is based on an operation according to the homodyne or heterodyne principle. The same also applies to the interferometric correction means. In a homodyne interferometer system the laser light is generated by a homodyne laser containing light not only from one frequency component. Homodyne interferometers are commercially available, for example, from Renishaw plc. The light generated by the homodyne laser is divided in a beam splitter in a fixed relationship (preferably 50:50) in two partial beams. One of the beams has its frequency shifted on reflection at a mirror on the measuring object due to the Doppler effect when the mirror and therefore the positioning stage is moved. The measuring value is derived from the frequency shift. For the interferometric correction means, a frequency shift of the light of the two partial beams is achieved based on wavelength variations due to the climate in a distance of predeterminable length which is traversed by only one of the partial beams.

An interferometric correction means could therefore be in the form of a heterodyne or homodyne system and could have a suitable laser and corresponding evaluation electronics. The same applies to an interferometric measuring means. The two systems could also be mixed, i.e., a measuring value could be determined using a homodyne system and another measuring value could be determined using a heterodyne system.

An interferometric measuring means based on a heterodyne system will be described in more detail together with the interferometric correction means incorporated in it, if any. It is operated with the laser light of a heterodyne laser. The light of such a laser has two components of a linearly polarized light.

The two components of linearly polarized light are oriented essentially vertically to each other. The laser light could have a wavelength of 632.9 nm or a frequency of $4.7 \, 10^{14}$ Hz. The two components are distinguished from each other at least slightly by their wavelengths or frequencies. The frequency difference of the two components is for example in the order of megahertz, in particular the frequencies of the light components differ by about 2 MHz. The laser light is divided into two partial beams on a beam splitting surface. Herein the beam splitting surface could be provided, for example, by a polarization beam splitter or a beam splitting cube. One of the two partial beams could be redirected on at least one beam redirecting means in a direction such that the two partial beams are essentially parallel, for example, in the moving direction of the positioning stage or in the measuring direction of the interferometric measuring means. The beam redirection means could be, for example, a mirror or a glass component, in which the light is internally totally reflected.

The above described functions of the beam splitting surface and the beam redirecting means could be provided, while using as few optical components as possible, in the form of two wedge prisms adjacent to each other. The two wedge prisms are arranged so that they are adjacent to each other, and at least one surface of the two adjacent surfaces of the wedge prisms is the beam splitting surface if the light is incident in a suitable way. At least one of the surfaces adjacent to each other of the wedge prisms is a beam unification surface for the returned light beams. A further surface of the wedge prism opposite the surface of a wedge prism serving as a beam splitter serves as the beam redirecting means. In a concrete implementation one of the wedge prisms has a base in the form of a parallelogram. The other wedge prism has a base with four corners wherein there are two further sides at right angles to a first side and wherein a fourth side faces the first side in an alignment which is not parallel to the first.

The measuring beam passes from the beam splitting surface to a reflection means arranged on the positioning stage. The reference beam passes from the beam splitting surface to a fixedly arranged reference reflection means. The reflection means arranged on the positioning stage comprises, in particular, a mirrored area of the positioning stage or a mirror fixed on the positioning stage.

In an interferometric correction means two reference beams pass from the beam splitting surface in each case to a fixedly arranged reference reflection means. The lengths of the optical paths of the two reference beams differ.

A lambda/4 plate is provided in each measuring beam and in each reference beam in order to limit or define the number of passes of the light beams in the interferometric measuring means or in the interferometric correction means.

It is particularly preferable that at least one further beam redirecting means is provided generating a parallel beam offset and with which a light beam exiting from one of the wedge prisms can be directed one more time into the interferometric correction means and/or into the interferometric measuring means. Herein it is provided, in particular, that a light beam can be directed one more time into the interferometric correction means and/or into the interferometric measuring means or into a wedge prism which comprises at least two reunified partial beams. The beam redirecting means could be, for example, two mirrors at right angles to each other or a prism having a base in the form of a right triangle. On the one hand these simple means therefore allow a beam offset to be created and on the other hand the light beam to be directed into the interferometer again, so that the effective measuring or reference distance can be doubled.

The interferometric correction means and the interferometric measuring means, in a preferred embodiment, are in the form of a multi-axis interferometer, preferably in the form of a biaxial interferometer. In a multi-axis interferometer, the light beam incident into the interferometer is multiplied with the aid of an optical component. This can be carried out, for example, with a glass parallelepiped or a prism having a base in the form of a parallelogram and using the multiple reflections therein.

Also provided is a detection means with which the intensity of the overlapping partial beams is detectable. The partial beams can be overlapped for example with the aid of a polarization filter or detected downstream of a polarization filter.

In a concrete implementation a measuring signal can be extracted from the intensity detected in this manner, wherein a movement of the positioning stage causes a wavelength shift in at least one of the two partial beams, due to the Doppler effect, as a function of the moving velocity of the positioning stage. With velocities of the positioning stage on the order of several mm/s, the frequency shift is in the kHz range. The intensity of the overlapping partial beams is modulated with a beating frequency depending on the wavelength shift and can be detected and processed with a detection means and with suitably configured electronics.

It is provided, with particular preference, that the reference beams of at least two interferometer axes or reference beams are overlapped and detected by a detector in order to enable a direct evaluation of a variation of the wavelength of the laser light which is caused, for example, by a variation of the ambient conditions.

Basically the measuring device of the present invention can be utilized in various applications. Preferably it is provided that relative positions of the positioning stage are determined for movements only along one movement direction using an interferometric measuring means. If, for example, the positioning stage is configured such that it can be moved in two directions perpendicular to each other, the movements of the positioning stage are detected by two interferometric measuring means having partial beam paths for measuring which are also at right angles to each other. Such an application is usually present in coordinate measuring devices in which high precision measurements of the coordinates of structures on substrates are carried out, such as on masks, wafers, flat panel displays, vapor deposited structures, semiconductor substrates, illumination masks or optical data carriers, in particular for transparent substrates. The coordinates are determined relative to a reference point with the precision of a few nanometers. This is why the interferometric measuring means must be arranged with, and aligned with respect to, the positioning stage in such a way that a large portion of the beam path of the interferometric measuring means, i.e., the portion of the beam path serving for the measurement, is essentially parallel to the movement direction of the positioning stage. Therefore, for a positioning stage moveable in three directions, an interferometric measuring means must be provided for each spatial direction in which the positioning stage is to be moved.

It is also conceivable for relative positions of a positioning stage to be movable in only one movement direction (linear displacement stage) to be determined. In this case it is sufficient to provide only one interferometric measuring means with which the relative positions of the positioning stage can be determined. The interferometric measuring means could be arranged relative to the positioning stage in such a way that a large portion of the beam path of the interferometric measuring means is essentially parallel to the movement direction of the positioning stage.

With respect to a method for determining relative positions of a positioning stage configured to be moveable in at least one direction by a predeterminable traversing path, the initially mentioned object is achieved by the features of claim 21. In the method according to the present invention measuring results for determining relative positions of the positioning stage are generated by means of at least one interferometric measuring means for a movement along one movement direction. An interferometric measuring means is operated with the laser light of a laser at at least one wavelength. An interferometric correction means is for generating correction results allowing conclusions to be drawn on the actual wavelength of the laser light during a position determination of the positioning stage in order to take into account the variations of the wavelength of the laser light, in particular due to ambient conditions, when evaluating the measuring results. According to the invention, the interferometric correction means is proximate to the interferometric measuring means, and the proximity corresponds to a predeterminable portion of the maximum traversing path of the positioning stage.

A method of the present invention is suitable, in particular, for operating a measuring device and comprising the steps of:
 operating a measuring apparatus;
 determining measuring results for relative positions of the positioning stage for a movement along a movement direction, wherein the measuring results are generated with at least one interferometric measuring means;
 operating the interferometric measuring means with laser light of a laser at at least one wavelength; and,
 generating correction results with the interferometric correction means, allowing conclusions to be drawn with respect to the actual wavelength of the laser light during a position determination of the positioning stage, in order to take into account a variation of the wavelength of the laser light, in particular due to ambient conditions, when evaluating the measuring results, wherein the interferometric correction means is proximate to the interferometric measuring means, and in that the proximity corresponds to a predeterminable portion of the maximum traversing path of the positioning stage.

BRIEF DESCRIPTION OF THE DRAWINGS

There are various possibilities to improve upon and develop further the teachings of the present invention in an advantageous manner. Reference is made, in particular, to the patent claims depending on claim 1 and also to the following explanation of the preferred exemplary embodiments of the invention with reference to the drawings. In the context of the explanation of the preferred exemplary embodiments of the invention with reference to the drawings, generally preferred embodiments and further developments of the teaching are also explained. In the drawing, always as a schematic representation.

DETAILED DESCRIPTION OF THE INVENTION

Figure 1:
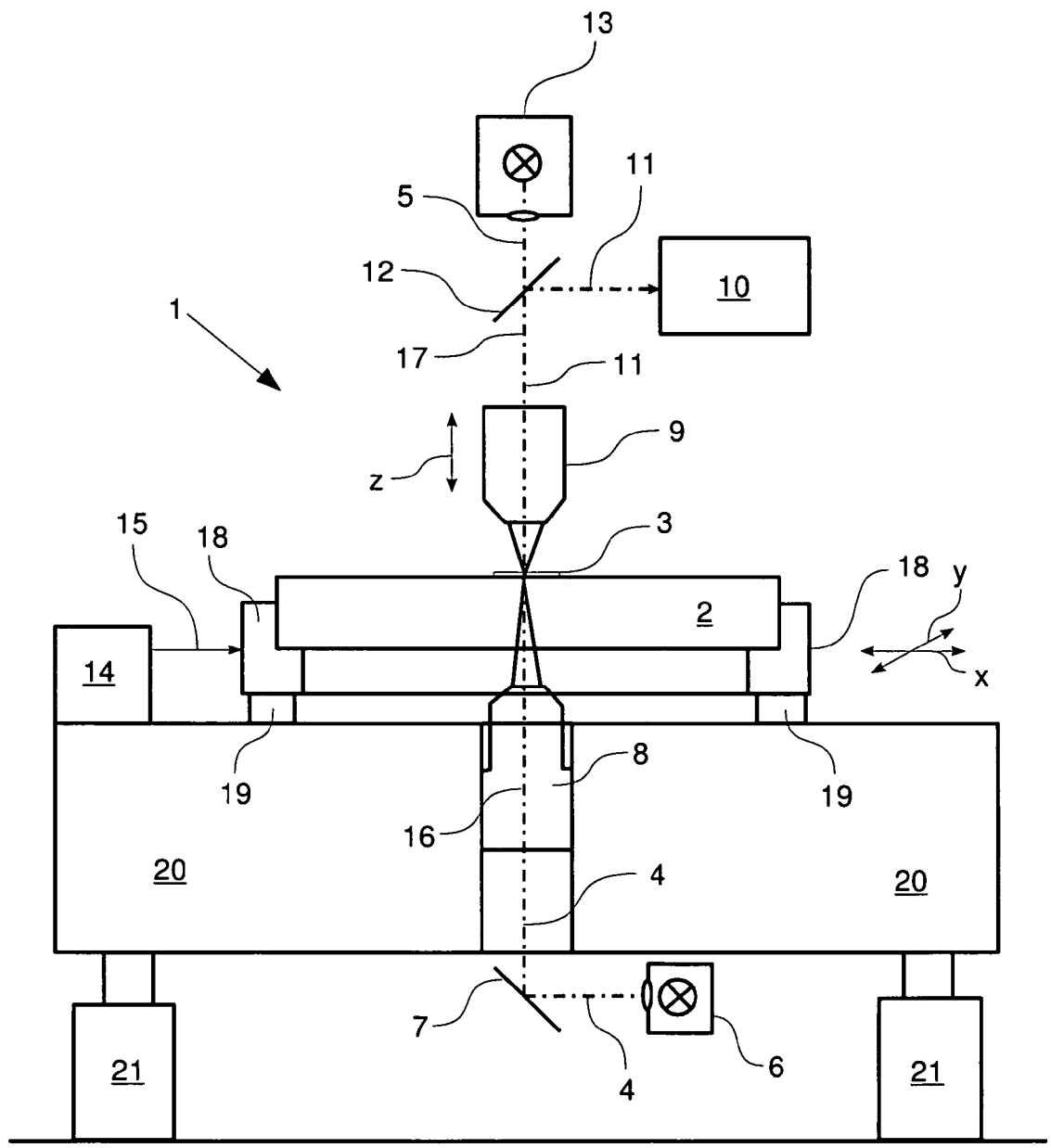
FIG. 1 shows a coordinate measuring device known from the prior art.

Components which are similar or the same are indicated with the same reference numerals throughout the figures. FIG. 1 shows a coordinate measuring device 1 with which it is possible to optically inspect objects 2. Object 2 shown in FIG. 1 is a mask, which can be of quartz glass for example. Structures 3 are applied to the mask, which are inspected with the coordinate measurement device 1. Coordinate measurement device 1 comprises two illumination beam paths 4 and 5, wherein illumination beam path 4 is for the transmitted-light mode and illumination beam path 5 is for the incident-light mode of coordinate measurement device 1. For the transmitted-light mode, a light source 6 is provided for emitting light in the near ultraviolet and which is reflected by mirror 7 towards an illumination optics configured in the form of a condenser 8. The light of illumination beam path 4 passes through object 2 and is at least substantially collected by imaging optics 9 and imaged onto detector 10. Detection beam path 11 therefore extends from object 2 to detector 10, wherein the light coming from object 2 is almost entirely reflected by beam splitter 12 towards detector 10. Imaging optics 9 can be moved by a focusing means, not shown in the figure, along the z direction indicated by a double arrow, whereby object 2 or structures 3 can be focused. Condenser 8 can also be moved along the z direction in the same way.

Coordinate measurement device 1 also has an incident-light mode. In this mode object 2 is illuminated with light from light source 13, a portion of which passes through beam splitter 12 (e.g., a so-called 50:50 splitter) and illuminates object 2 via imaging optics 9. The illumination light reflected on object 2 or on structures 3 in this mode passes in the reverse direction through imaging optics 9 and is reflected on beam splitter 12 towards detector 10. Accordingly, illumination beam path 5 extends from light source 13 to object 2. Illumination beam path 4 extends from light source 6 to object 2.

Imaging optics 9 is a high-resolution, apochromatically corrected microscope optics adapted for light in the near ultraviolet. Detector 10 is in the form of a high-resolution CCD camera and is driven and read out by a computer evaluation and analysis system, not shown in FIG. 1. Reference numerals 16 and 17 indicate the optical axes of illumination beam paths 4, 5.

Object 2 is supported on a positioning stage 18 and moveable along two different x and y directions indicated by the two double arrows. Positioning stage 18 has a frame in which object 2 is placed. Interferometric measuring means 14 is only schematically shown, with which the position of positioning stage 18 can be measured interferometrically via light beams 15. The frame of positioning stage 18 is supported on an air cushion 19 and can be moved on granite block 20 in a substantially frictionless manner. Granite block 20 is supported on legs 21 in a vibration-damped way.

Figure 2:
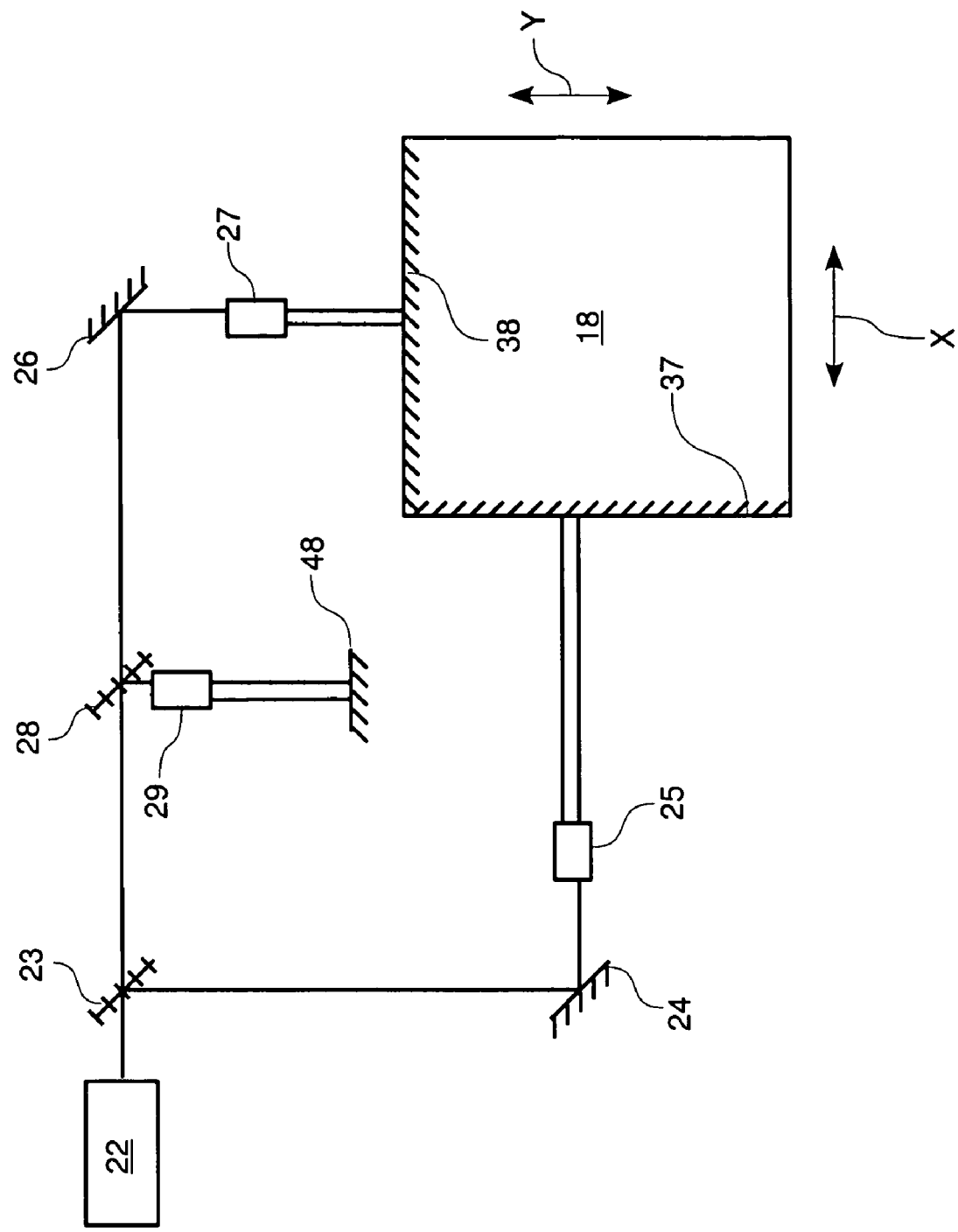
FIG. 2 shows the optical beam path of two interferometric measuring means and an interferometric correction means as used, for example, for determining the position of a positioning stage in a coordinate measuring device known from the prior art.

FIG. 2 is a schematic top view of positioning stage 18 with the optical beam path for determining the positions into which positioning stage 18 can be brought. Traversing path VX of positioning stage 18 in the x direction and traversing path VY of positioning stage 18 in the y direction are only schematically shown and essentially depend on each application, the dimensions of positioning stage 18, and/or the dimensions of the object to be measured. Laser 22 emits laser light, wherein the laser light has two components of linearly polarized light which are vertical to each other. The laser light is divided by beam splitter 23 into two partial beams, wherein one partial beam is directed toward mirror 24 and interferometric measuring means 25, and the other partial beam is directed toward interferometric measuring means 27 via mirror 26. Interferometric measuring means 25 is for determining relative positions of positioning stage 18 in the x direction (as indicated by the arrow). Interferometric measuring means 27 is for determining relative positions of positioning stage 18 in the y direction (as indicated by the arrow). A beam splitter 28 is arranged between beam splitter 23 and mirror 26, with which part of the laser light can be passed into an interferometric correction means 29. The measuring results measured by interferometric correction means 29 are for correcting variations in the result measured by interferometric measuring means 25, 27 due to variations in the ambient conditions.

The laser light is divided into two partial beams 25a, 25b or 27a, 27b in each of interferometric measuring means 25, 27, respectively. One of the partial beams 25b or 27b (i.e., each reference beam) is reflected twice by a fixed reference mirror 60 and 61, respectively, and is made to overlap partial beam 25a or 27a, respectively. The second partial beam 25a or 27a (i.e., each measuring beam) is also reflected twice on the reflection means of positioning stage 18 in the form of a mirrored area 37, 38, respectively. Only one reflection is shown in FIG. 2. The two-fold reflection of the partial beams 25a, 27a, 25b, 27b is described in more detail in the portion of the description referring to FIG. 5.

In interferometric correction means 29 the laser light is divided into two partial beams 29a, 29b. One of the partial beams 29a (i.e., the first reference beam) is reflected twice by a fixed reference mirror 62 and is made to overlap the second partial beam 29b (i.e., the second reference beam). The second partial beam 29b is also reflected twice by the fixed reference mirrors 63.

The two reference mirrors 62, 63 are advantageously fixed to each other and arranged at different distances to the beam splitter (not shown in FIG. 2). Partial beams 29a, 29b also have differing optical path lengths in interferometric correction means 29. The precision of the correction measurement with the aid of interferometric correction means 29 depends on the path length difference of the two reflected partial beams 29a, 29b. Moreover, the correction quality is the higher, the more the changes in climate on the correction distance correspond to those on the measuring distance.

Figure 3:
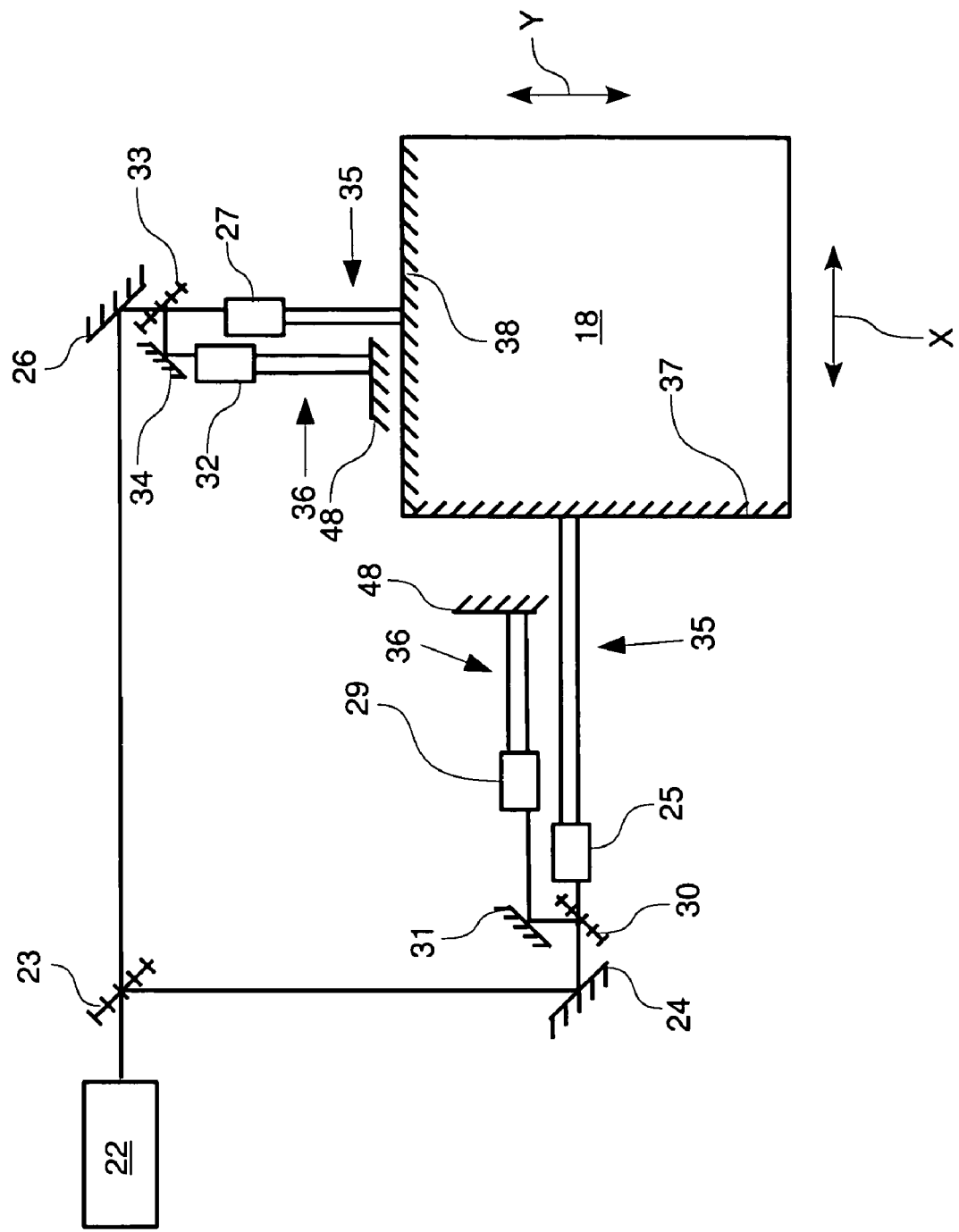
FIG. 3 shows a first embodiment of a measuring device according to the present invention.

FIG. 3 is a schematic top view of a positioning stage 18 and the optical beam path for determining positions into which positioning stage 18 can be brought. The optical beam path is shown in FIG. 3 in a way essentially comparable to the optical beam path in FIG. 2. According to the present invention, however, an interferometric correction means 29 is arranged proximate to the interferometric measuring means 25, i.e., in a directly adjacent or neighboring relationship. Between mirror 24 and beam splitter 23, a beam splitter 30 is arranged, with the aid of which a portion of the light of laser 22 can be directed toward interferometric correction means 29. A second interferometric correction means 32 is similarly arranged close to interferometric measuring means 27, also in a directly adjacent relationship. Between mirror 26 and beam splitter 23, a beam splitter 33 is provided, with which part of the light of laser 22 is directed toward second interferometric correction means 32 via beam splitter 33. The two reference beams of this interferometric correction means 32 are indicated with reference numerals 32a, 32b in analogy to those of interferometric correction means 29. It can only be schematically derived from FIG. 3 that the portions of beam paths 35 used for measuring, in the concrete case measuring beam 25a, 27a, or reference beams 25b, 27b, of interferometric measuring means 25, 27, respectively, are arranged or aligned in parallel to the portions of beam paths 36 relevant for detecting changes in the ambient conditions, i.e., reference beams 29a, 29b, 32a, 32b, of interferometric correction means 29, 32. The partial beams 25a, 27a of beam parts 35 of interferometric measuring means 25, 27, which are used for measuring, pass from the laser to the mirrored areas 37, 38 of positioning stage 18, from where they are reflected. As in FIG. 2, only one reflection is shown in FIG. 3.

Figure 4:
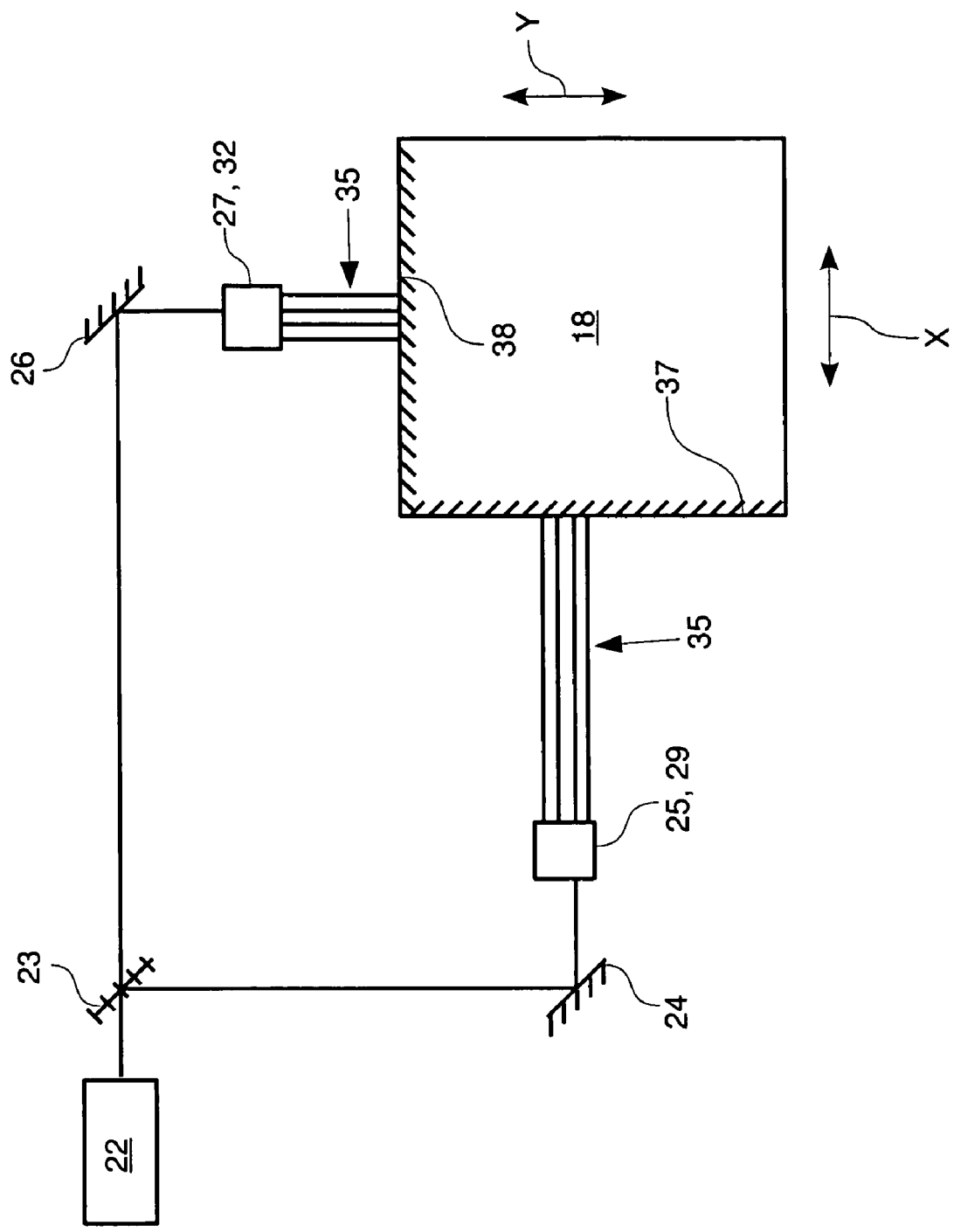
FIG. 4 shows a second embodiment of a measuring device according to the present invention; and, FIG. 5 shows the beam path of an interferometric measuring device into which the interferometric correction means is incorporated.

FIG. 4 is a schematic top view of a positioning stage 18 and the optical beam path for determining the positions into which positioning stage 18 can be brought. The optical beam path in FIG. 4 is basically comparable to the optical beam path in FIG. 3; however, the interferometric correction means 29, 32 are incorporated into the interferometric measuring means 25, 27 in FIG. 4. In each case, they are implemented as a biaxial interferometer. As a result, beam splitters 30, 33 and the two individual interferometers 29, 32, as indicated in FIG. 3, can be advantageously omitted. It is therefore no longer necessary to adjust these components during the manufacture of the coordinate measuring device.

Figure 5:
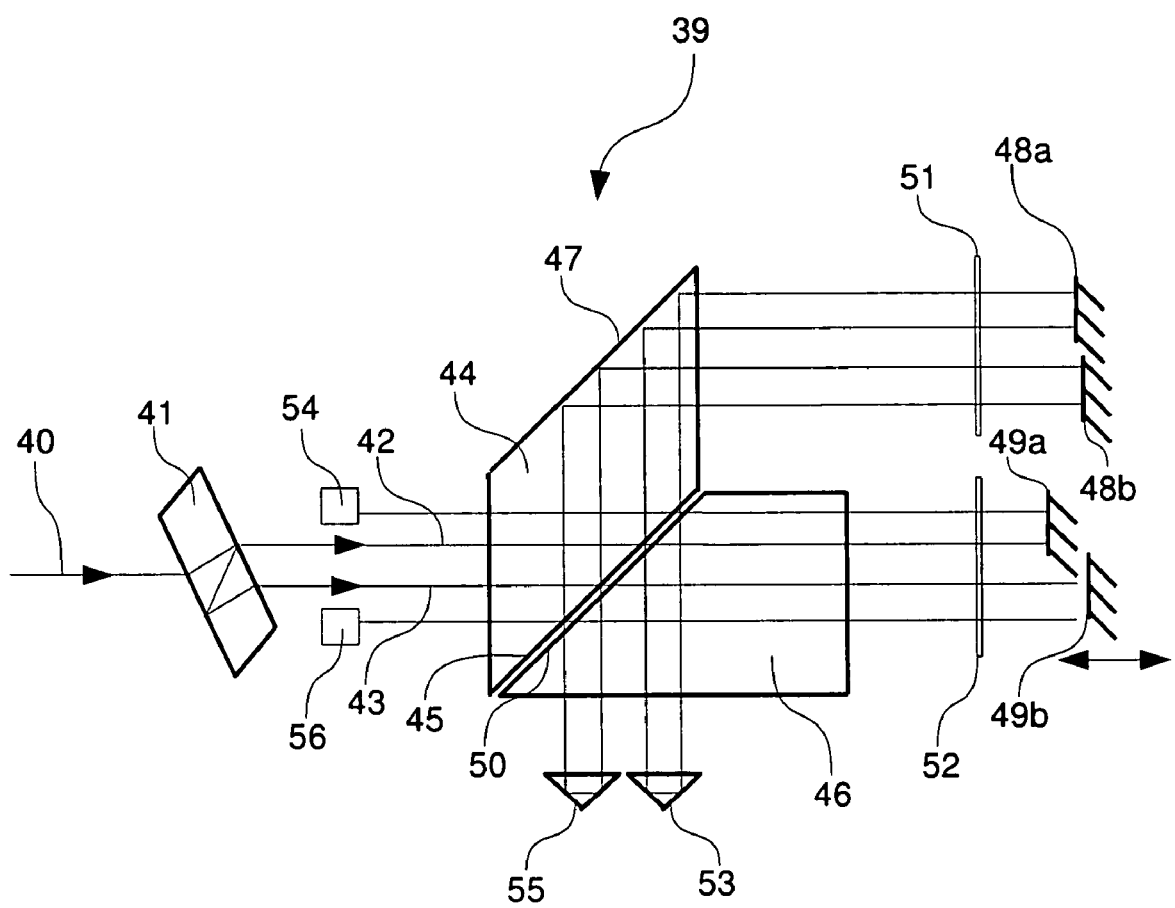

FIG. 5 is a schematic top view of an exemplary embodiment of a measuring apparatus 39 according to the present invention, which has an interferometric measuring means and an interferometric correction means. Therefore the interferometric correction means is incorporated into the interferometric measuring means in the form of a biaxial interferometer. Laser light 40 coming from a light source not shown in FIG. 5 and entering into measuring device 39 passes through prism 41 causing the incident light beam 40 to be divided into two partial beams 42, 43 due to a first partial internal reflection and a second internal total reflection. Laser light 40 from the light source is linearly polarized light having a wavelength of 632.9 nm or a frequency of $4.7 \times 10^{14}$ Hz. It has two components of light waves vertical to each other. One of the light waves has a very slight frequency shift, of about 2 MHz, with respect to the other light wave.

The beam path of partial beam 43, which is used for the position measurement will initially be described. Partial beam 43 enters a first wedge prism 44. The first wedge prism 44 has a base in the form of a parallelogram. Due to the orientation of the polarization directions of the two light waves vertical to each other of partial beam 43, i.e., in the plane of the drawing and vertical to the plane of the drawing, partial beam 43 is divided into two further partial beams. The division into two further partial beams occurs at the interface between surface 45 of wedge prism 44 and surface 50 of the second wedge prism 46. The two linearly polarized beams oriented vertical to each other are thereby divided according to their polarization directions and therefore their frequency. The light beams reflected at the interface 45 are internally reflected on surface 47 of wedge prism 44, so that one of the two partial beams passes toward reference mirror 48b. Reference mirror 48b is fixed.

The portion of partial beam 43 not reflected at interface 45 passes in the same direction through wedge prism 46 toward measuring mirror 49b. Measuring mirror 49b is fixed on the moveable positioning stage 18 and directly follows the movements of positioning stage 18, not shown in FIG. 5. The partial beams passing both between wedge prism 44 and reference mirror 48b and between wedge prism 46 and measuring mirror 49b pass λ/4 plates 51 and 52, respectively, causing the linearly polarized light components of the partial beams to become circularly polarized light rotated in phase by about 45 degrees.

The partial beams are reflected on reference mirror 48b and measuring mirror 49b, respectively, and pass through λ/4 plates 51, 52 again and cause the circularly polarized light to become linearly polarized light again, having a light rotated in phase by a further 45 degrees, which is now rotated by 90 degrees with respect to the original orientation. The light from reference mirror 48b, after internal reflection on surface 47, is now incident on interface 45, 50 of wedge prisms 44 and 46, where, due to its rotated orientation by 90 degrees, it is not deflected but passes through wedge prism 46 in a straight line. The light from measuring mirror 49b is now reflected at the interface 50, 45 of wedge prisms 44 and 46 due to its rotated orientation, also by 90 degrees. These partial beams now pass through wedge prism 46 to the beam redirection means in the form of a prism 55 which directs the partial beams after twofold internal reflection with a parallel beam offset towards surface 50 of wedge prism 46. Since the direction of polarization does not change at beam redirection means or prism 55, the partial beams are transmitted or reflected as before on interface 50, 45 of wedge prisms 46, 44, so that they are directed in the same direction towards mirrors 48b, 49b, from where they came. After passing once again through the two λ/4 plates 51, 52, the partial beams entering into wedge prisms 44, 46 have their polarization direction rotated again by 90 degrees. The partial beams internally reflected on surface 47 and passing through wedge prism 44 are reflected or transmitted on interface 45 toward a first detection means 56. The light beams from measuring mirror 49b and entering into wedge prism 46 pass through wedge prism 44 also towards detection means 56 without being reflected. With the aid of a polarization filter, not shown, in detection means 56, the interferometric overlap of the two divided and reunified partial beams can be detected, which have originally entered wedge prism 44 with partial beam 43.

Similarly, partial beam 42 coming from prism 41 towards wedge prism 44 passes through wedge prisms 44, 46, through λ/4 plates 51, 52 to reference mirror 48a and reference mirror 49a, respectively. Reference mirror 49a is not moveable but advantageously fixedly connected with reference mirror 48a, also fixed. After reflection at reference mirror 48a and reference mirror 49a, respectively, the partial beams pass to the beam redirection means in the form of a prism 53 which also redirects the partial beams with a beam offset back into wedge prisms 46, 44. After a further reflection on reference mirror 48a or reference mirror 49a, respectively, the partial beams are again reflected at surface 45 or 50 towards further detection means 54. Detection means 54 is for detecting the interferometric overlap of the two divided and reunified partial beams with the aid of a polarization filter, not shown, originally entering wedge prism 44 for the first time as partial beam 42.

The lightwave resulting from the overlap still has the input frequency; it is modulated, however, with the beating frequency which is dependent on the frequency difference. The two frequency components are Doppler shifted by the ambient conditions and the component referred to as the measuring beam, as well as by the movement of the measuring stage. When positioning stage 18 and therefore measuring mirror 49b is moved, there is a Doppler shift of the frequency of the partial beam reflected on measuring mirror 49b. In the overlapped light this results in the beating signal (about 2 MHz) which can be resolved by detection means 56 and downstream electronics and processed into a position signal. The beating frequency of the light beams reflected on the two fixed mirrors 48a, 49a and overlapped, which are detected by detection means 54, is proportional to the change in wavelength and can be detected due to the different optical paths or paths of differing length up to mirrors 48a and 49a.

In the present embodiment, fixed mirrors 48a, 48b, 49a are all in a different position with respect to the vertical of the mirror surfaces. Mirrors 48a, 48b, 49a could also be separately fixed on a coordinate measuring device, or, preferably, on a common support arranged on the coordinate measuring device.

Finally, it should be noted in particular that the above discussed exemplary embodiments only serve to describe the teaching claimed; however, they do not limit it to the exemplary embodiments.

What is claimed is:

1. A measuring apparatus for determining relative positions of a positioning stage moveable in at least one direction (X, Y) within a predeterminable maximum traversing path, comprising:
   at least one interferometric measuring device; and,
   at least one interferometric correction device, wherein measuring results for determining relative positions of the positioning stage for a movement along a movement direction are generated by the at least one interferometric measuring device, wherein the at least one interferometric measuring device is operable with laser light of a laser of at least one wavelength, wherein correction results are generated with the at least one interferometric correction device, wherein said interferometric correction device is arranged to determine an actual wavelength of the laser light during a position determination of the positioning stage in order to correct for a variation of the wavelength of the laser light when evaluating the measuring results, and wherein the interferometric correction device is proximate to the interferometric measuring device and the proximity corresponds to a predeterminable portion of the maximum traversing path of the positioning stage.

2. The measuring apparatus according to claim 1, wherein the interferometric correction device is arranged in an area traversable by the positioning stage and said interferometric correction device is above or below the positioning stage.

3. The measuring apparatus according to claim 1, wherein the interferometric correction device is directly adjacent to the interferometric measuring device and at least a portion of a beam path of the interferometric measuring device is aligned parallel to at least a portion of a beam path of the interferometric correction device.

4. The measuring apparatus according to claim 1, wherein the interferometric correction device is incorporated in the interferometric measuring device and beam paths of the interferometric measuring device and the interferometric correction device are aligned in parallel.

5. The measuring apparatus according to claim 1, wherein the interferometric correction device or the interferometric measuring device is configured as a homodyne interferometer or a heterodyne interferometer, and laser light is generated correspondingly by a homodyne laser or by a heterodyne laser.

6. The measuring apparatus according to claim 1, wherein the laser light comprises two components of linearly polarized light, the two components are oriented vertical relative to each other, and the two components slightly differ in their wavelengths.

7. The measuring apparatus according to claim 6, wherein the laser light is divided into two partial beams at a beam splitting surface, one of the two partial beams is redirected at at least one beam redirecting device in a direction and the two partial beams are parallel.

8. The measuring apparatus according to claim 7 further comprising two wedge prisms, each wedge prism comprising at least one surface, wherein one surface of each of the two wedge prisms are arranged adjacent to each other forming two adjacent surfaces, at least one surface of the two adjacent surfaces forms the beam splitting surface, at least one of the two adjacent surfaces forms a beam reunification surface, and an additional surface of the wedge prism, opposite the beam splitting surface forms the beam redirecting device.

9. The measuring apparatus according to claim 1, wherein, in the interferometric correction device, two reference beams pass from a beam splitting surface, each to a fixed reflection means, each reference beam comprising an optical path having a length and the length of each optical path of the two reference beams is different.

10. The measuring apparatus according to claim 1, wherein a $\lambda/4$ plate is provided in each of a measuring beam and reference beam.

11. The measuring apparatus according to claim 10, wherein a signal is extracted from a detected intensity, a movement of the positioning stage causes a wavelength shift as a function of a movement velocity of the positioning stage due to the Doppler effect at least in the measuring beam, and an intensity of overlapping partial beams is modulated with a beating frequency as a function of the wavelength shift.

12. The measuring apparatus according to claim 1, wherein the interferometric correction device and the interferometric measuring device form a multi-axis interferometer.

13. The measuring apparatus according to claim 1, wherein a detection device is provided, with which an intensity of overlapping partial beams is detected.

14. The measuring apparatus according to claim 13 further comprising a polarization filter arranged to aid in detecting said intensity.

15. The measuring apparatus according to claim 1, wherein the interferometric measuring device determines relative positions of the positioning stage for movements only along one movement direction (X, Y).

16. The measuring apparatus according to claim 15, wherein a substantial portion of a beam path of the interferometric measuring device is aligned parallel to the movement direction (X, Y) of the positioning stage.

17. The measuring apparatus according to claim 1 wherein the positioning stage is arranged to be moveable in only one movement direction, and relative positions of the positioning stage are determined using only one interferometric measuring device.

18. The measuring apparatus according to claim 1, wherein ambient conditions cause said variation of the wavelength.

19. A method of determining relative positions of a positioning stage arranged in a moveable fashion in at least one direction (X, Y) within a predeterminable maximum traversing path, comprising the steps of:
   operating a measuring apparatus;
   determining measuring results for relative positions of the positioning stage for a movement along a movement direction, wherein the measuring results are generated with at least one interferometric measuring device;
   operating the interferometric measuring device with laser light of a laser at at least one wavelength; and,
   generating correction results with an interferometric correction device, wherein said interferometric correction device is arranged to determine an actual wavelength of the laser light during a position determination of the positioning stage, in order to correct for a variation of the wavelength of the laser light, when evaluating the measuring results, and wherein the interferometric correction device is proximate to the interferometric measuring device, and the proximity corresponds to a predeterminable portion of the maximum traversing path of the positioning stage.

20. The method of determining relative positions of a positioning stage according to claim 19, wherein ambient conditions cause said variation of the wavelength.

* * * * *